United States Patent [19]

Bradshaw

[11] 4,366,715

[45] Jan. 4, 1983

[54] PRESSURE TESTING APPARATUS

[75] Inventor: John H. Bradshaw, Hingham, Mass.

[73] Assignee: The Gillette Company, Boston, Mass.

[21] Appl. No.: 212,929

[22] Filed: Dec. 4, 1980

Related U.S. Application Data

[63] Continuation of Ser. No. 84,482, Oct. 15, 1979, abandoned.

[51] Int. Cl.³ .............................................. G01L 7/00
[52] U.S. Cl. ..................................................... 73/714
[58] Field of Search ................ 73/862.61, 862.53, 714, 73/37

[56] References Cited

U.S. PATENT DOCUMENTS

| | | | |
|---|---|---|---|
| 1,637,421 | 8/1927 | Lipschutz | 73/862.53 X |
| 3,421,369 | 1/1969 | Freehauf | 73/862.53 |
| 4,094,188 | 6/1978 | Bellouin et al. | 73/862.53 X |

FOREIGN PATENT DOCUMENTS

| | | | |
|---|---|---|---|
| 1419640 | 10/1965 | France | 73/862.61 |
| 1480789 | 5/1967 | France | 73/862.61 |

*Primary Examiner*—Edward R. Kazenske
*Assistant Examiner*—Joseph W. Roskos
*Attorney, Agent, or Firm*—Leonard J. Janowski

[57] ABSTRACT

Apparatus for testing internal pressure of a pressurized container having a ball partially extending outwardly from a ball seat includes a vise for holding the container in a fixed position and a force generating transducer arranged to provide a force proportional to the internal pressure for moving an end of a lever arm against the ball and statically holding the ball in a position substantially midway between first and second extremities of the ball seat.

5 Claims, 3 Drawing Figures

PRESSURE TESTING APPARATUS

This application is a continuation of application Ser. No. 084,482, filed on Oct. 15, 1979, now abandoned.

BACKGROUND OF THE INVENTION

1. Field of the Invention

This invention relates to pressure testing apparatus, and, more particularly, to apparatus for testing internal pressure in a pressurized writing instrument.

2. Description of the Prior Art

Pressurized ball point writing instruments generally include an ink cartridge containing a column of ink and a writing ball loosely assembled in a ball seat formed at one end of the cartridge. An opposite end of the cartridge is sealed by a plug. A gas, at superatmospheric pressure is contained in a space between the plug and the ink column so as to force the ink column to move toward the writing ball, and the writing ball to move against an annular rim holding the ball in the ball seat.

Prior art apparatus for testing the gas pressure in the cartridge includes a pressure transducer adapted to provide an electrical output signal proportional to an applied force. The transducer output signal is transmitted to a calibrated meter or recorder for presenting a visual indication of the applied force. Under test conditions, the writing ball in the cartridge would be moved against the transducer until the ball moved away from the rim. In order to distinguish the ball movement from transient noise pulses generated by the transducer, the ball would be moved very slowly. The force required to move the ball is proportional to the internal gas pressure forcing the ball against the rim. However, the excessive time period required to move the ball made the prior art test apparatus sensitive to external vibrations. In addition, the force sensed by the transducer and visually presented by the recorder exhibited a hysteresis error when the writing ball was moved away from the transducer.

Accordingly, a test apparatus and method is disclosed in which hysteresis error is minimized and testing time is greatly reduced.

SUMMARY OF THE INVENTION

In an apparatus for testing internal pressure of a pressurized container having a ball partially extending outwardly from a ball seat but free to move between first and second ball seat extremities, the improvement comprises a pivotally movable lever arm having a first end and a second end. Holding means hold the container in a fixed position with the ball against the lever arm first end. Sensing means are coupled also to the lever arm first end for generating an electrical signal proportional to instantaneous pivotal displacement of the lever arm. Transducer means are coupled to the lever arm second end for generating a first force in response to a first electrical signal for pivotally moving the lever arm and causing the ball to move from the first ball seat extremity to the second ball seat extremity. A second force is generated by the transducer means in response to a second electrical signal for statically holding the ball in a position substantially midway between the first and second ball seat extremities. The second force is substantially proportional to the internal pressure. Electronic control means are coupled to the transducer means and the sensing means. The electronic control means automatically supplies the first and second electrical signals to the transducer means. The second electrical signal is supplied by the electronic control means in response to the electrical signal generated by the sensing means. Recording means are coupled to the electronic control means for indicating magnitude of the second force and displacement of the ball from the first ball seat extremity to the second ball seat extremity.

DESCRIPTION OF THE PREFERRED EMBODIMENT

Figure 1:
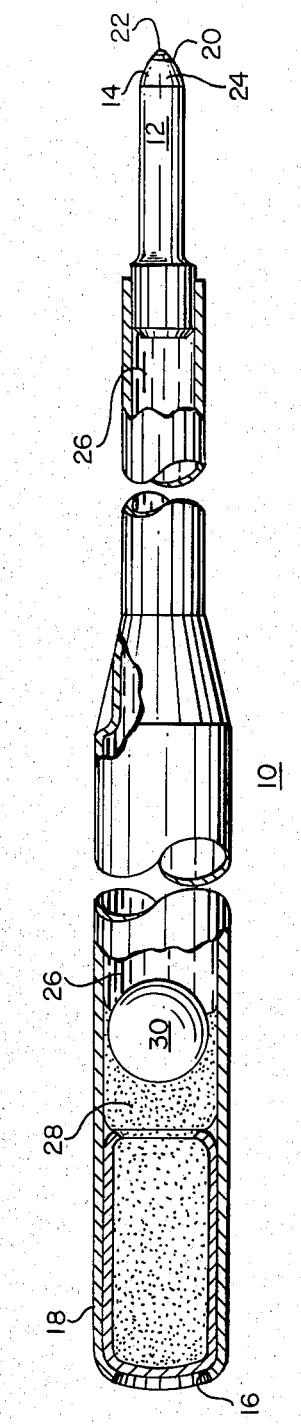
FIG. 1 is a longitudinally sectioned drawing of a tubular ink cartridge.
Figure 2:
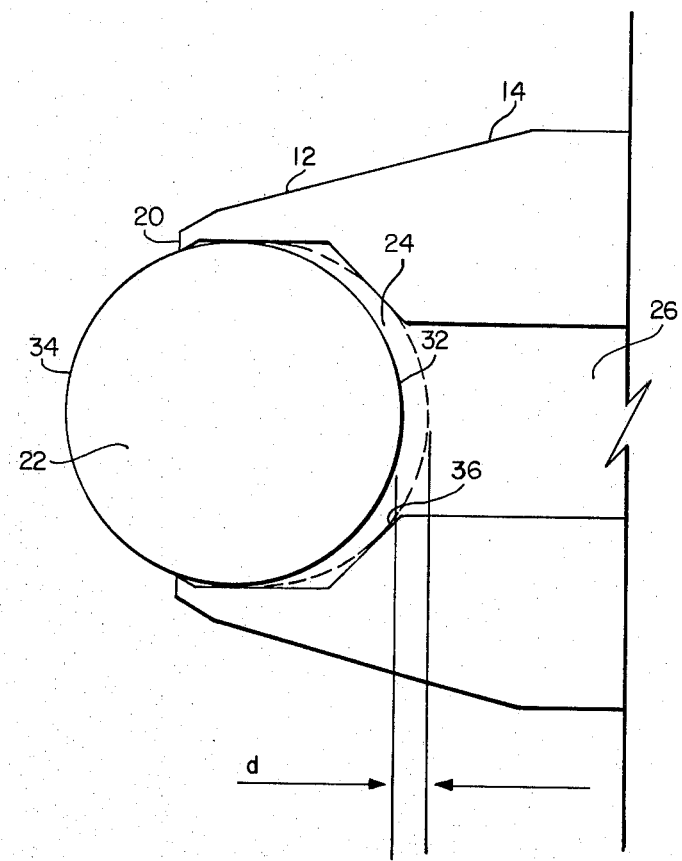
FIG. 2 is a detailed sectioned drawing of a ball holder shown in FIG. 1.

Referring to FIGS. 1 and 2, there is shown longitudinally sectioned drawings of a tubular ink cartridge 10 and a ball holder 12 formed at one end 14 of the cartridge 10. An opposite end 16 of the cartridge is sealed by a plug 18. The ball holder 12 includes an annular rim 20 adapted to rotatably hold a writing ball 22 loosely assembled in a ball seat cavity 24. The writing ball 22 partially extends beyond the rim 20 and is intended to dispense ink from an ink column 26 contained within the cartridge 10 as the ball 22 is rotated across a surface. A gas at superatmospheric pressure is contained in a space 28 between a ball follower 30 floating on top of the ink column 26 and the plug 18. The gas causes an internal pressure or outward force to be exerted against the inside surface of the cartridge 10 including the ball follower 30, the ink column 26, and a portion 32 of the writing ball surface 34 inside the cartridge 10. The writing ball 22 is free to move a distance, d, away from the rim 20 and against a ball seat extremity 36. It has been determined that the magnitude of an external force causing the writing ball 22 to remain in a static position substantially midway between the rim 20 and ball seat extremity 36 is proportional to the internal gas pressure and to the cross sectional area of the writing ball 22. Thus, the apparatus described below is arranged to provide a non-destructive method of testing the magnitude of the gas pressure within the cartridge 10 by measuring the force necessary to support the writing ball 22 in a static position intermediate the rim 20 and ball seat extremity 36.

Figure 3:
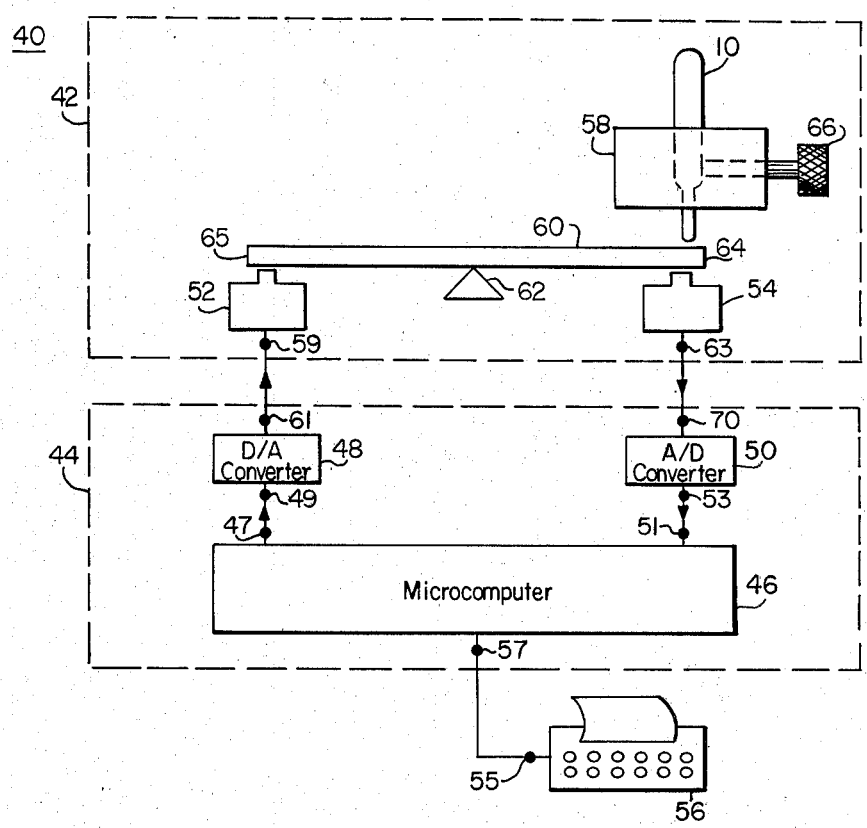
FIG. 3 is a block diagram of testing apparatus arranged according to the invention.

Referring to FIG. 3, there is shown a block diagram of apparatus 40 arranged to test the internal gas pressure in the cartridge 10. The testing apparatus includes a mounting assembly 42 and an electronic control unit 44. The control unit 44 includes a microcomputer 46 having a first output terminal 47 electrically corrected to an input terminal 49 of a digital-to-analog converter 48, and an input terminal 51 connected to an output terminal 53 of an analog-to-digital converter 50. The microcomputer 46 is programmed, as known in the art, to transmit first and second electrical signals to a force transducer 52 via converter 48. The second electrical signal is supplied by the microcomputer 46 in response to an electrical signal from a displacement transducer 54 included in the mounting assembly 42. The microcomputer 46 also supplies electrical signals indicative of pressure and displacement of the ball 22 to an input terminal 55 of a recorder 56 such as a teletypewriter electrically connected to a second output terminal 57 of the microcomputer 46. An example of a suitable microcomputer is KIM-1, Model 6502, available from MOS Technology, Inc., 950 Ritten House Rd., Norristown, PA.

Incorporated into the mounting assembly 42 is a cartridge holder 58 in the form of a vise and a lower arm 60 adapted to be pivotally moved about a pivot 62 by forces provided by the force transducer 52. An example of the force transducer 52 is a voice coil force driver of the type commonly used in loudspeakers. The cartridge holder 58 is arranged to hold and reference the position of the writing ball 22 in the ink cartridge 10 relative to the position of the lever arm 60. For example, the cartridge 10 is inserted into the vice so that the writing ball 22 is above and touching an anvil end 64 of the lever arm 60. A thumb screw 66 is screwed into the vise and against the cartridge 10 to secure the cartridge 10 in a fixed position.

The voice coil driver 52 is mechanically coupled to an end 65 of the lever arm 60 and has an input terminal 59 electrically connected to an output terminal 61 of the digital-to-analog converter 48 in the electronic control unit 44 so as to convert the magnitude of the analog electrical signal received from the converter 48 to a proportional mechanical force which is then directed against the lever arm 60 causing it to pivotally move the lever arm end 64 against the writing ball 22. The force directed against the writing ball 22 via the lever arm end 64 can be increased or decreased incrementally (stepped), held constant, or released depending on the analog electrical signal supplied to the voice coil driver 52 by the converter 48. In the preferred embodiment, the microcomputor 46 is programmed to supply digital electrical signals to the converter 48 for conversion to analog electrical signals. The signals supplied by the microcomputer 46 to the converter 48 are selected to cause the voice coil driver 52 to provide sufficient force to first move the writing ball 22 via the lever arm 60 from the rim 20 to the ball seat extremity 36, and then sufficient force to hold the writing ball 22 in a static position substantially midway between the rim 20 and ball seat extremity 36. The displacement of the ball 22 from the rim 20 to the ball seat extremity is referred to as "ball play".

The distance measuring transducer 54 is arranged, as known in the art, to provide an analog electrical output signal proportional to the instantaneous pivotal displacement of the lever arm end 64. An example of the distance measuring transducer 54 is transducer Model M60-1 available from Dymac, P.O. Box 671, San Diego, Calif. In the preferred embodiment, the distance measuring transducer 54 is mechanically coupled to an end 64 of the lever arm 60 and has an output terminal 63 electrically connected to an input terminal 70 of the analog-to-digital converter 50 in the electronic control unit 44 so as to provide a conductive path for the transducer 54 electrical output signal. Thus, after the microcomputer 46 supplies the appropriate digital signals to the converter 48 for causing the voice coil driver 52 to move the ball 22 from the rim 20 to the ball seat extremity 36, the transducer 54 provides an analog electrical output signal proportional to the displacement of the ball 22. The analog-to-digital converter 50 receives the analog electrical output signal from the distance measuring transducer 54 and, in turn, transmits a corresponding digital electrical signal to the microcomputer 46 which is programmed to respond by supplying an appropriate digital signal to the converter 48. As discussed above, the converter 48 then provides an analog signal to the voice coil driver 52 to cause the lever arm end 64 to move so that the writing ball 22 is in a preferred position substantially midway between the rim 20 and ball seat extremity 36. The magnitude of the force required to statically hold the writing ball 22 in the preferred position is a measure of the gas pressure in the cartridge 10. An electrical signal proportional to the magnitude of the holding force and gas pressure as well as ball play is transmitted by the microcomputer 46 to the teletypewriter 56 for a visual presentation.

A preferred embodiment of the invention has been shown and described. Various other embodiments and modifications thereof will be apparent to those skilled in the art, and will fall within the scope of the invention as defined in the following claims.

What is claimed is:

1. In apparatus for testing internal pressure of a pressurized container having a sealed end and a ball partially extending outwardly from a ball seat, said ball being free to move between first and second ball seat extremities, the improvement comprising:

a pivotally movable lever arm having a first end and a second end;

means for holding said container in a fixed position with said ball against said lever arm first end;

sensing means being coupled to said lever arm first end for generating an electrical signal proportional to instantaneous pivotal displacement of said lever arm;

transducer means being coupled to said lever arm second end for generating a first force in response to a first electrical signal for pivotally moving said lever arm and causing said ball to move from said first ball seat extremity to said second ball seat extremity, and a second force in response to a second electrical signal for statically holding said ball in a position substantially midway between said first and second ball seat extremities, said second force being substantially proportional to said internal pressure;

electronic control means being coupled to said transducer means and said sensing means, said electronic control means automatically supplying said first and second electrical signals to said force generating transducer means, said second electrical signal being supplied in response to said electrical signal generated by said sensing means; and recording means being coupled to said electronic control means for indicating magnitude of said second force and displacement of said ball from said first ball seat extremity to said second ball seat extremity.

2. Testing apparatus according to claim 1, wherein said holding means is a vise.

3. Testing apparatus according to claim 1, wherein said electronic control means include a digital-to-analog converter connected to said transducer means and an analog-to-digital converter connected to said sensing means.

4. Testing apparatus according to claim 3, wherein said electronic control means include a microcomputer having a first output terminal connected to said digital-to-analog converter and an input terminal connected to said analog-to-digital converter.

5. Testing apparatus according to claim 4 further including said recording means connected to a second output terminal of said microcomputer to present a visual indication of said second force.

* * * * *